No. 869,977. PATENTED NOV. 5, 1907.
C. W. MICHAEL.
FERTILIZER ATTACHMENT FOR PLANTERS.
APPLICATION FILED SEPT. 20, 1906.

3 SHEETS—SHEET 1.

No. 869,977. PATENTED NOV. 5, 1907.
C. W. MICHAEL.
FERTILIZER ATTACHMENT FOR PLANTERS.
APPLICATION FILED SEPT. 20, 1906.

3 SHEETS—SHEET 3.

Witnesses:—
Inventor:—
Clement W. Michael
by Peirce & Fisher
Attys:—

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION.

FERTILIZER ATTACHMENT FOR PLANTERS.

No. 869,977.    Specification of Letters Patent.    Patented Nov. 5, 1907.

Application filed September 20, 1906. Serial No. 335,339.

*To all whom it may concern:*

Be it known that I, CLEMENT W. MICHAEL, a citizen of the United States, and a resident of Racine, county of Racine, and State of Wisconsin, have invented certain new and useful Improvements in Fertilizer Attachments for Planters, of which the following is a specification.

The invention relates to fertilizer attachments for planters and in particular to fertilizer dropping attachments for hill drop or check-row corn planters and the object of the invention is to provide simple and effective means by which the fertilizer charges may be dropped at different distances from the hills of corn.

For best results, it is often desirable to drop the charges of fertilizer at different distances from the separate hills of corn in accordance with the varying conditions of the soil and the varying amounts of fertilizer used. With the usual fertilizer attachments for corn planters, the seed and fertilizer discharging valves are connected together to operate simultaneously, so that the fertilizer and seed are always at fixed distances apart. In the present improvement, means are provided for dropping the fertilizer and seed at different distances as desired and preferably the seed discharging and fertilizer discharging valves are operated by separate independent mechanisms.

The invention consists in features of construction, combinations and arrangements of parts hereinafter set forth, illustrated in the accompanying drawings and more particularly pointed out in the appended claims.

Figure 1:
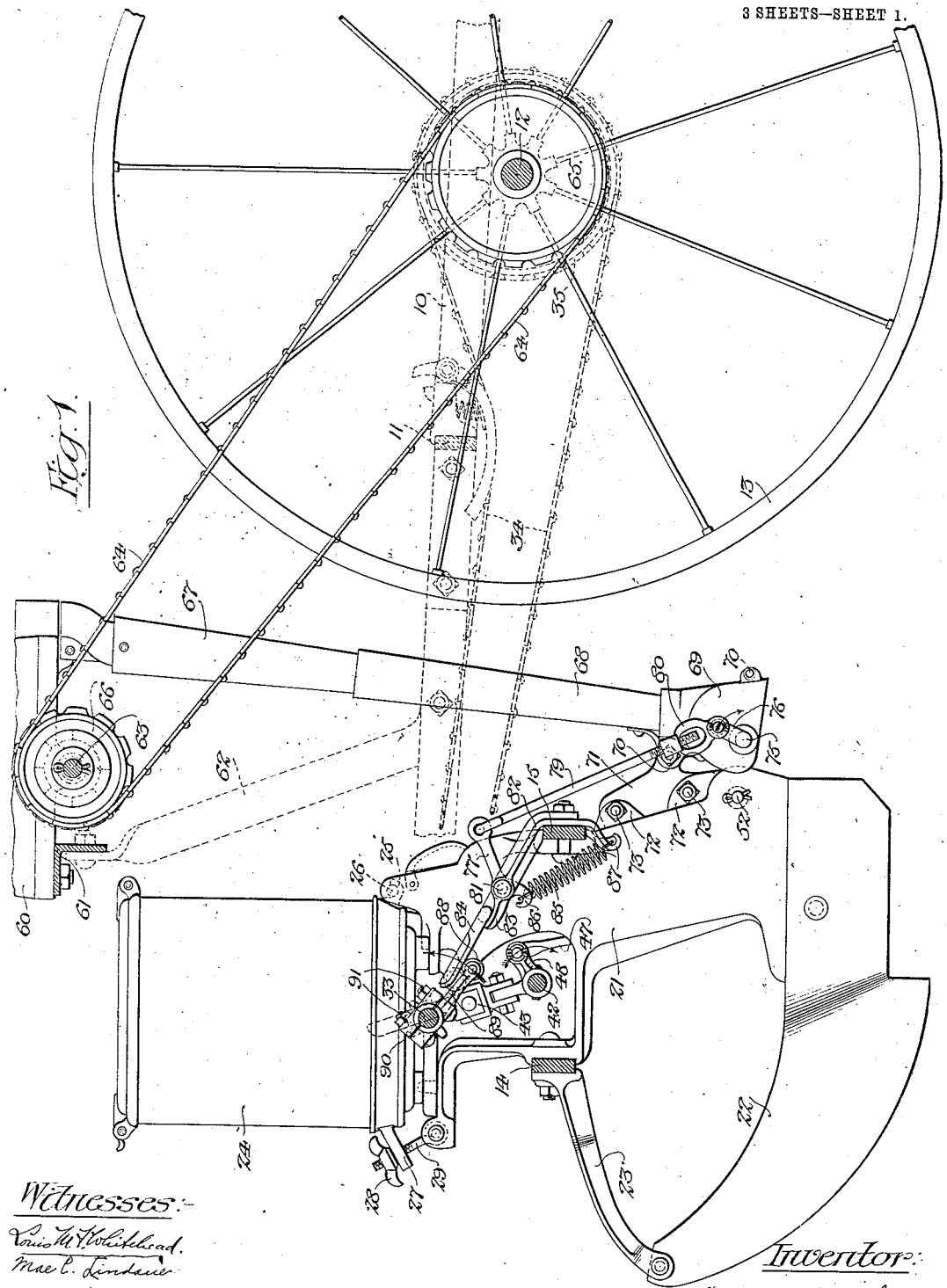
Figure 2:
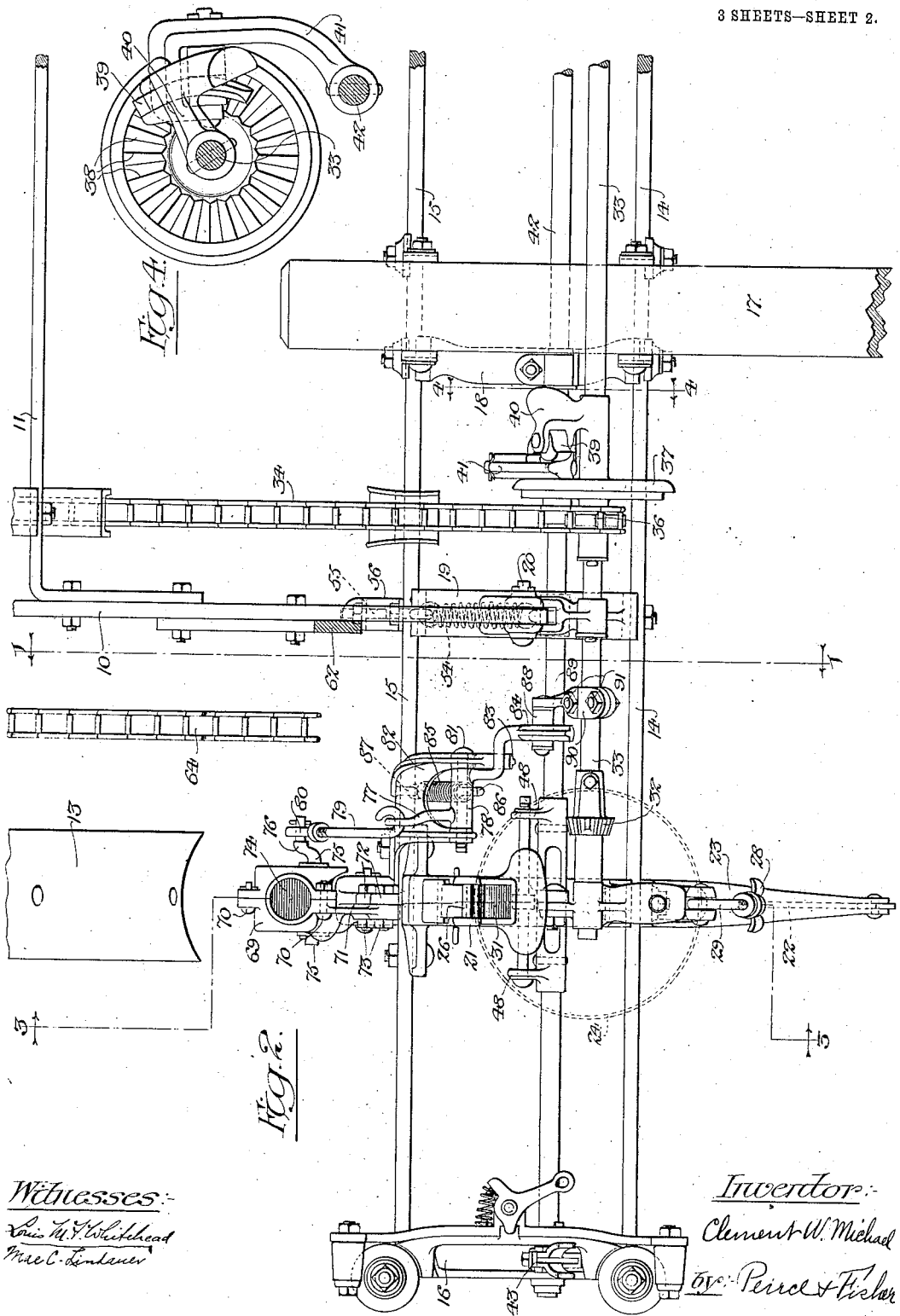
Figure 3:
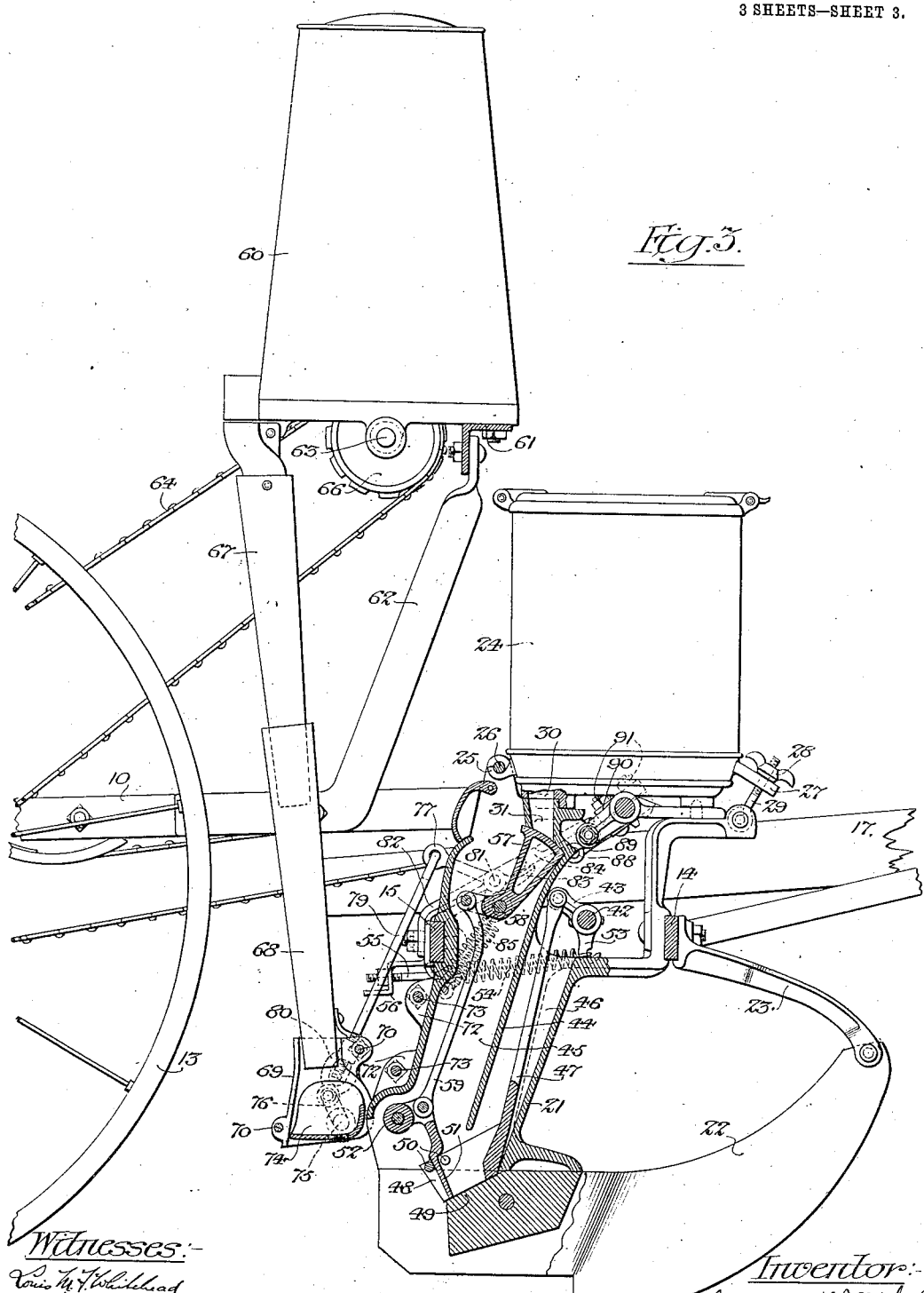

In the drawings Figure 1 is a view in elevation of the seed and fertilizer dropping mechansims with certain parts shown in section on the line 1—1 of Fig. 2. Fig. 2 is a plan view of the parts shown in Fig. 1 with the fertilizer and seed hoppers removed. Fig. 3 is a view in elevation of the fertilizer and seed dropping mechanisms with the seed delivery spout and the seed and fertilizer discharging valves shown in section on the line 3—3 of Fig. 2. Fig. 4 is a view in elevation of the clutch mechanism with parts shown in section on the line 4—4 of Fig. 2.

The planter to which the improvement is applied is of the usual double row type consisting of a main frame and a front runner frame carrying the seeding devices. A portion only of the machine is shown in the drawings.

The main frame consists of side bars 10 connected by a cross bar 11 and mounted upon the axle 12 of the ground wheels 13. The runner frame comprises the front and rear bars 14 and 15 connected at their ends by the check row head 16 and intermediate their ends by the tongue 17 and cross pieces 18 and 19. Side bars 10 of the main frame are pivoted to the cross pieces 19 by bolts 20.

A seed discharge chute or boot 21 of suitable form is secured between the front and rear bars 14 and 15 of the runner frame and the furrow opener or shoe 22 is secured at its rear end to the lower end of the boot 21, and at its forward end to a brace bar 23, which in turn is secured to the front bar 14. A seed can or hopper 24 is carried upon the upper portion of the casting which forms the boot or hollow runner shank. At its rear portion, the can bottom is provided with a hook 25 engaging a cross pintle 26 at the upper portion of the runner shank 21 and at its forward part the can bottom is provided with a lug 27 that is engaged by a wing nut 28 threaded on bolt 29 that is pivoted to the upper portion of the casting. The seed can may be provided with any suitable form of seed plate arranged to deliver the seed through a discharge opening 30 (see Fig. 3) which communicates with an opening 31 in the upper portion of the boot. The seed plate in the can or hopper 24 is driven by a beveled pinion 32 that is fixed to a rotating shaft 33 (see Fig. 2). Shaft 33 is suitably journaled in the upper portion of the casting that forms a boot or hollow runner shank and in the cross bar 19 of the runner frame. This operating shaft for the seed plate is driven from the wheel axle 12 through the medium of a suitable clutch mechanism. A drive chain 34 passes over a sprocket wheel 35, that is fixed upon wheel axle 12, (see Fig. 1) and over a sprocket wheel 36 (see Fig. 2) that is loosely mounted upon the shaft 33. A clutch disk 37 is connected to or formed in piece with the sprocket 36 and is provided on its face with a series of ratchet teeth 38. A dog 39 carried upon an arm 40, that is fixed to the shaft 33, is arranged to engage the teeth of the ratchet disk 37 but is normally held out of contact with the teeth by a trip arm 41 mounted on a check-row rock shaft 42. This rock shaft is journaled in the cross pieces 18 and 19 of the runner frame and in the check-row head 16 and carries at its end a fork 43, which is engaged by the knots on the check-row wire to rock the shaft 42. When the shaft is rocked, the trip arm 41 is thrown back and the dog 39 engages the teeth 38 of the clutch disk 37 so that the shaft 33 is rotated through one revolution, when the dog 39 is again thrown out of engagement with the clutch disk by the trip arm 41.

Any suitable form of clutch mechanism may be employed, that here shown being substantially similar to the clutch set forth in the application of William Sobey and Charles E. Mohr, Serial No. 282,411, filed Oct. 12, 1905.

The boot or hollow runner shank 21 may be provided with any suitable form of seed delivery valves, the arrangement here shown is substantially similar to that set forth in the patent of William Sobey on combined check-row and drill planters, No. 736,307, dated Aug. 11, 1903. The boot or hollow runner shank is divided by a longitudinal partition 44 into a rear seed tube or chute 45 and a forward chamber 46 within which extends a plunger 47. The upper end of the plunger is pivoted to a crank arm 48 that is fixed to the check-row rock shaft 42. The lower end of the plunger is provided with an extension 48 that rests upon a rearwardly and downwardly inclined shelf 49 at the rear end of the shoe. Pins 50 of the extension 48 of the plunger engage a drop valve 51 that is pivoted to the runner shank at its upper end by a cross bolt 52. The check-row rock shaft 42 is provided with a hook 53 and a spring 54 extends between the hook and an adjusting bolt 55 that extends through a piece 56 fixed to the rear bar 15 of the runner frame. This spring holds the rock shaft 42 in normal position with the drop valve 51 closed and the forks on the ends of the shaft at the forward limit of their throw. When the shaft is rocked by the engagement of the knots on a check-row line with the fork 43, the clutch is thrown into operation, as described, to move the seed plate of the hopper 24 and at the same time, the plunger 47 is moved downwardly to open the valve 51 and push the seed from the shelf 49.

A check valve 57 pivoted in the upper end of the seed tube or chute 45 upon a cross bolt 58, normally closes the opening or orifice 31 at the upper end of the seed chute. The seed is accumulated upon the check valve 57 which is connected to the drop valve 51 by a link 59 so as to be opened therewith. Other forms of valves may be employed without departure from the essentials of the invention.

The box or hopper 60 for the fertilizer is, in the form shown, arranged above and slightly in rear of the seed can 24 and is mounted upon an angle bar 61 that is fixed to uprights 62. These uprights are secured at their lower ends to the side bars 10 of the main frame. The hopper 60 may be provided with any suitable form of delivery mechanism which is operated by cross shaft 63 journaled in the hopper bottom and driven from the wheel axle 12 by a chain 64 (see Fig. 1) which passes over a sprocket wheel 65 on the wheel axle and a sprocket wheel 66 on the shaft 63.

The fertilizer passes from the box or hopper 60 through a delivery chute or tube that is, in the form shown, formed of upper and lower telescoping sections 67 and 68. The upper chute section 67 is fixed at its upper end to the seed box or hopper 60 while the lower chute section 68 is fixed at its lower end to a valve casing 69. Valve casing 69 is split or formed of separate cast sections that are held together by bolts 70 and one of the sections of the valve casing is provided with an extension 71 that is secured to lugs 72 on the rear portion of the boot 21 by bolts 73. The upper section of the fertilizer delivery chute and the box or hopper for the fertilizer are thus carried on the main frame of the machine while the lower chute section and the delivery valve in the casing 69 are carried by the boot or shank 21 on the front runner frame.

The valve 74 in the casing 69 is provided with pintles 75 extending through the sides of the casing and one of these pintles is provided with a crank portion 76 (see Figs. 1 and 2). The crank 76 is connected by a link to an arm 77 on a sleeve 78. The connecting link is preferably formed of separate sections 79 and 80 that are adjustably threaded together. The sleeve 78 (see Figs. 1 & 2) is journaled upon a horizontal bolt 81 that extends between the arms of a U-shaped bracket 82. Bracket 82 is bolted to the rear bar 15 of the runner frame and one of its arms is provided with an extension 83. Sleeve 78 is provided with an upwardly and forwardly projecting arm 84 which is provided with a laterally offset portion arranged to engage the extension or stop 83. A spring 85 (shown most clearly in Fig. 1) extends between a hook 86 on the sleeve 78 and a hook 87 on the bracket 82 and holds the arm 84 on the sleeve normally in engagement with the stop or extension 83, in which position the fertilizer discharge valve 74 is closed.

The arm 84 (see Figs. 1 & 2) is arranged to be struck and operated by a roller 88 upon the end of a tappet arm 89. This tappet arm is secured to the shaft 33 by a clamp plate 90 and bolts 91 which extend through the arm and clamp plate on opposite sides of the shaft. By loosening the nuts on the bolts 91 the tappet arm may be rotatably adjusted upon the shaft 33 and then clamped in any desired position.

When the shaft 42 is rocked by a check row line, the drop valve in the bottom of the boot is opened to deposit the hill of corn. At the same time, the clutch is thrown into operation to rotate the shaft 33 through a single revolution and tappet arm 89 on the shaft 33 strikes the arm 84 and shifts the parts connected therewith against the tension of the spring 85 to open the fertilizer discharge valve 74. When the tappet arm 89 is adjusted, as shown in Fig. 1, so that it is normally adjacent the arm 84 the fertilizer valve will be opened almost as soon as the seed valve and the fertilizer will be deposited close to the hill of corn. By adjusting the tappet arm 89 so that it normally stands further away from the arm 84, the fertilizer discharge valve will not be opened until the shaft 33 and tappet arm 89 has traveled through a portion of its movement. It is obvious, that by adjusting the tappet arm 89 so that it normally stands further and further away from the operating arm 84 of the fertilizer discharge valve, the latter may be operated to drop the fertilizer further and further away from the point at which the hill of corn is dropped. It should also be noted that this adjustment may be very easily and readily effected simply by changing the position of the tappet arm 89 upon the shaft 33.

Where the soil is poor and a large amount of fertilizer is to be deposited at each hill, it is desirable that the fertilizer shall be deposited some distance from the hill but where the soil is rich and when a small amount of fertilizer is to be placed at each hill, it is desirable that it should be dropped quite close to the seed. The improved fertilizer attachment may be very readily and easily adapted for depositing the fertilizer at any desired distance from the hill.

It is obvious that numerous changes may be made in the details of structure set forth and that the invention should be broadly construed since it is believed the present invention presents the first instance of a fertilizer attachment which may be readily set to deposit the fertilizer at any desired distance from the hill.

Having described my invention, what I claim as new and desire to secure by Letters Patent is;—

1. In check-row planters, the combination with the seed and fertilizer hoppers, discharge chutes leading from said hoppers and valves in said chutes, of means for operating said seed valve and separate adjustable means for operating the fertilizer valve, whereby the fertilizer may be dropped at different distances from the seed, substantially as described.

2. In planters, the combination with the seed and fertilizer discharging devices, of means for variably operating said devices in different timed relation whereby the fertilizer may be dropped at different distances from the seed.

3. In check-row planters, the combination with the seed and fertilizer hoppers, discharging chutes leading from said hoppers and discharging valves in the lower ends of said chutes, of actuating devices for said seed discharging valve and separate adjustable actuating devices for said fertilizer discharging valve, whereby the fertilizer may be dropped at different distances from the seed, substantially as described.

4. In planters, the combination with the seed and fertilizer discharging valves arranged in line, of operating mechanism arranged to variably operate said valves in different timed relation, whereby the fertilizer may be dropped at different distances from the seed.

5. In planters, the combination with the seed and fertilizer discharging valves arranged in line, of mechanism for actuating the seed discharging valve, separate independent mechanism for actuating the fertilizer discharging valve and means controlled by the seed valve actuating mechanism for throwing the fertilizer valve actuating mechanism into operation.

6. In check-row planters, the combination with the seed dropping mechanism and the fertilizer dropping mechanism arranged in line, of devices for variably operating said seed and fertilizer dropping mechanisms, whereby the fertilizer may be dropped at different distances from the seed, substantially as described.

7. In planters, the combination with the seed dropping mechanism and the fertilizer dropping mechanism in line therewith, of actuating means for said seed dropping mechanism and separate adjustable actuating means for said fertilizer dropping mechanism, whereby the fertilizer may be dropped at different distances from the seed.

8. In planters, the combination with the seed and fertilizer dropping mechanisms and discharging valves therefor, of actuating means for the seed discharging valve, separate adjustable actuating means for the fertilizer discharging valve and devices controlled by the seed valve actuating means for throwing the fertilizer valve actuating means into operation.

9. In planters, the combination with the seed and fertilizer dropping mechanisms and with the discharging valves therefor, of a check rower for operating said seed discharging valve and mechanism driven from the ground wheels for operating the fertilizer discharging valve.

10. In planters, the combination with the seed and fertilizer dropping mechanisms and separate discharging valves therefor arranged in line, of a swinging check-row lever, actuating connections between said check-row lever and said seed discharging valve, a shaft driven from the ground wheels and means actuated by said shaft for operating the fertilizer discharging valve.

11. In planters, the combination with the seed and fertilizer dropping mechanism and discharging valves therefor, of a check row lever operatively connected to said seed discharging valve, a shaft driven from the ground wheels, an adjustable tappet arm on said shaft and means actuated by said tappet arm for tripping the fertilizer discharging valve, substantially as described.

12. In planters, the combination with the seed and fertilizer discharging devices, of a check rower operatively connected to said seed discharging devices and means driven from the ground wheels and controlled by said check rower for operating the fertilizer discharging device.

13. In planters, the combination with the seed and fertilizer discharging valves, of a check-row lever connected to the seed discharging valve, mechanism for operating the fertilizer discharging valve, and a clutch controlled by said check-row lever for connecting said mechanism to the ground wheels, substantially as described.

14. In planters, the combination with the seed and fertilizer dropping mechanism and discharging valves therefor, of a check-row lever operatively connected to the seed discharging valve, mechanism for operating the fertilizer discharging valve, a continuously driven clutch member and means controlled by said check-row lever for operatively connecting said clutch member to the actuating mechanism of the fertilizer discharging valve.

15. In planters, the combination with the seed and fertilizer dropping mechanisms and discharging valves therefor, of a check-row lever operatively connected to said seed discharging valve, an adjustable tappet arm, means tripped by said tappet arm for operating the fertilizer discharging valve and a clutch controlled by said check-row lever for operatively connecting said tappet arm to the ground wheels, substantially as described.

16. In planters, the combination with the seed and fertilizer dropping mechanisms and separate discharging valves therefor arranged in line, of a check-row lever operatively connected to the seed discharging valve, a shaft, a clutch controlled by said check-row lever for intermittently connecting said shaft to the ground wheels, a tappet arm adjustably mounted on said shaft and means actuated by said tappet arm for operating the fertilizer discharging valve.

17. In planters, the combination with the seed and fertilizer dropping mechanisms and separate discharging valves therefor arranged in line, of a check-row rock shaft having an arm connected to operate the seed discharging valve, a rotary seed shaft, a clutch for intermittently connecting said seed shaft to the ground wheels, a trip arm on the check-row rock shaft controlling said clutch, a tappet arm adjustably mounted on said seed shaft and a spring-held rock arm actuated by said tappet arm and operatively connected to the fertilizer discharging valve.

18. In check-row planters, the combination with the seed and fertilizer hoppers, discharging chutes leading therefrom and discharging valves in the lower ends of said chutes, of separate actuating devices for said seed and fertilizer discharging valves, and a check rower controlling the operation of said actuating devices, the actuating device for said fertilizer discharging valve being adjustable, whereby the fertilizer may be dropped at different distances from the seed, substantially as described.

CLEMENT W. MICHAEL.

Witnesses:
 ROY F. ADAMS,
 HARRY N. DONALDSON.